Nov. 2, 1948.　　　　　　　J. C. IVEY　　　　　　　2,452,930
ANGLE INDICATOR
Filed June 1, 1945　　　　　　　　　　　　　　2 Sheets-Sheet 1

J. C. Ivey
INVENTOR.

BY
Abrow Leo.
ATTORNEYS.

Nov. 2, 1948.   J. C. IVEY   2,452,930
ANGLE INDICATOR
Filed June 1, 1945   2 Sheets-Sheet 2
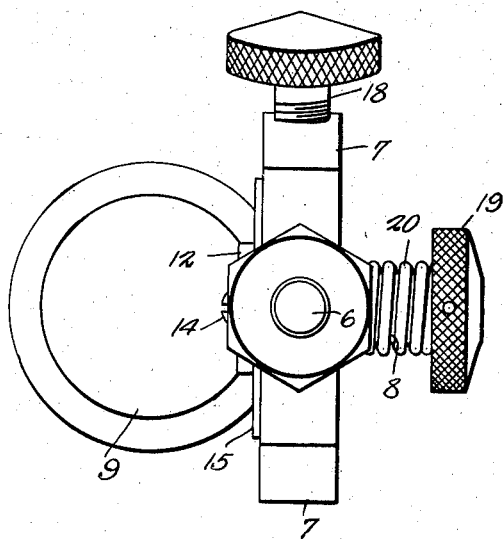
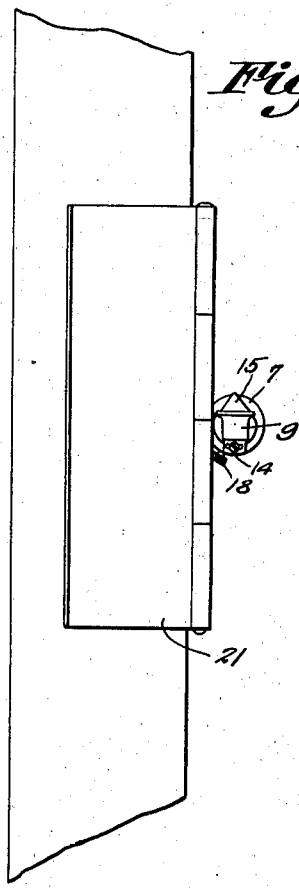
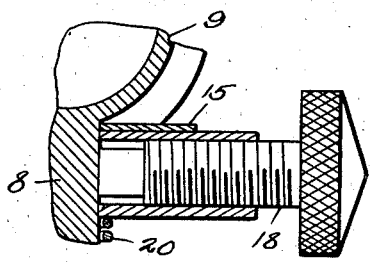
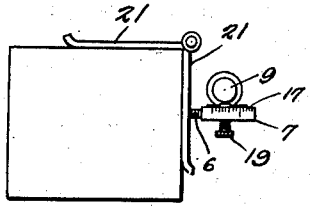
J. C. Ivey
INVENTOR.
BY *CHSnowLeo.*
ATTORNEYS.

Patented Nov. 2, 1948

2,452,930

UNITED STATES PATENT OFFICE 2,452,930

ANGLE INDICATOR

Julius C. Ivey, Cincinnati, Ohio

Application June 1, 1945, Serial No. 597,065

1 Claim. (Cl. 33—214)

This invention relates to an angle indicating device designed primarily for use in connection with drills, an important object of the invention being to provide a level including a body which may be secured to a hand drill, the level portion of the device being adjustably mounted on the body and having an indicator hand adapted to cooperate with graduations on the body, indicating the angle at which the drill is to be held, when drilling holes of predetermined angles.

An important object of the invention is to provide a device of this character which may be readily and easily connected with drills now in use, eliminating the necessity of making extensive alterations in the drills, in order to mount the device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 5 is a bottom plan view of the device.

Figure 6 is a sectional view taken on line 6—6 of Fig. 1.

Figure 7 is an elevational view illustrating the indicator as mounted on right-angled angle plates, whereby the device may be used in erecting vertical studding or joists.

Figure 8 is a plan view of the device as used with angle plates.

Figure 1:
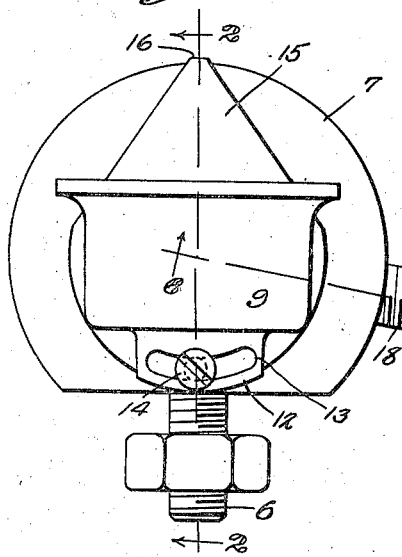
Figure 1 is an elevational view of an indicating device, constructed in accordance with the invention.
Figure 2:
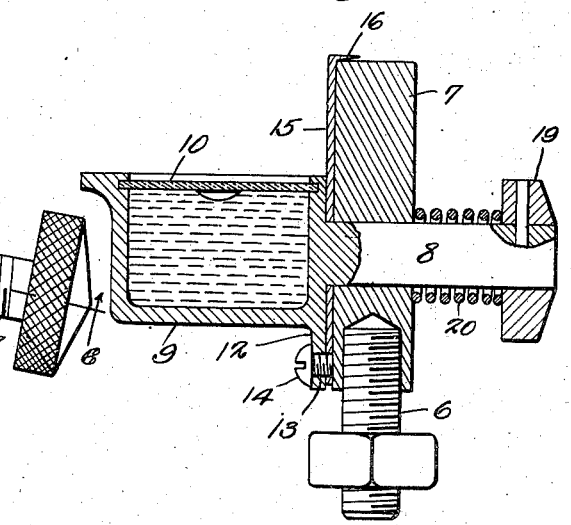
Figure 2 is a sectional view taken on line 2—2 of Fig. 1.
Figure 4:
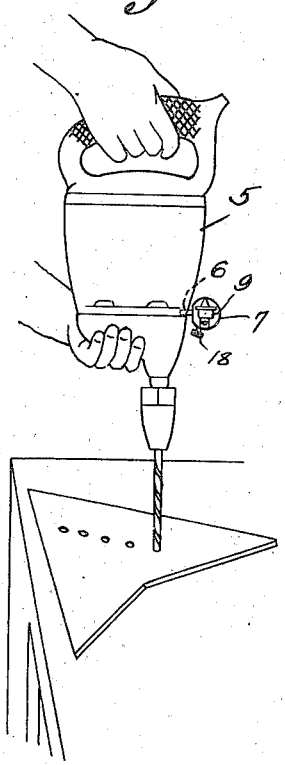
Figure 4 is an elevational view illustrating the indicating device as secured to a hand drill.
Figure 3:
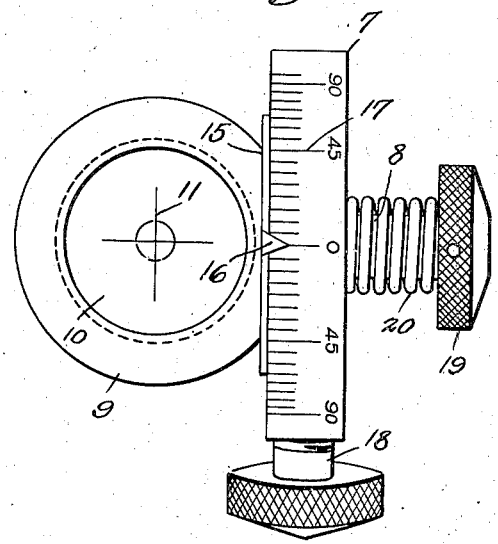
Figure 3 is a plan view of the device.

Referring to the drawings in detail, the reference character 5 designates a hand drill, to which the angle indicator is secured. The angle indicator is provided with a securing bolt 6 whch is positioned in a threaded opening of the body 7 of the indicator, the securing bolt being designed to be positioned in a threaded opening of the drill 5, with which it is used, as clearly shown by Fig. 4 of the drawings.

The body 7 is formed with an opening which extends through the center thereof, the opening adapted to receive the bolt 8 that is formed integral with the spirit level 9 which has its upper surface closed by means of the transparent wall 10 which is formed with cross lines 11 providing the lines with which the bubble in the spirit level 9 cooperates, in indicating the center of the level.

The spirit level 9 is formed with a depending flange 12 in which the arcuate-shaped opening 13 is formed, the opening 13 being designed to accommodate the screw 14 which is seated in a threaded opening of the indicator 15. This indicator 15 is formed with an opening to accommodate the bolt 8, and as shown, contacts one surface of the body 7, the extreme end of the indicator 15 being extended at right angle providing a pointer 16. Graduations 17 indicating various angular degrees, are formed on the outer edge of the body 7, the graduations cooperating with the pointer 16 in indicating the position in which the spirit level 9 is to be secured to cause the bubble of the leveling device to move under the lines 11, when the drill with which the device is used, is held at a predetermined angle.

Extending through a threaded opening of the body 7, is a securing screw 18, the inner end of the screw 18 contacting with the bolt 8, to secure the bolt 8 and spirit level with which it is connected, in its positions of adjustment.

Due to the construction of the arcuate-shaped opening 13, it will be seen that the indicator may be adjusted with respect to the spirit level, for accurate operation.

Mounted on the bolt 8 between the head 19 thereof, and the rear surface of the body 7 is a coiled spring 20 which is adapted to set up friction between the bolt 8, spirit level 9 and body 7, to facilitate the rotation of the bolt 8 in adjusting the spirit level.

From the foregoing it will be seen that due to the construction shown and described, a drill equipped with a device constructed in accordance with the invention, may be used at various angular positions with respect to the work, and the operator may, by viewing the bubble in the spirit level 9, hold the tool at the desired angle, insuring the true boring of the tool.

As shown by Figs. 7 and 8 of the drawings, the handle-indicating device is mounted on one of the hinged plates 21 which are adapted to be positioned against studding, rafters, posts or the like, to indicate angles.

While I have shown and described the invention as to be used primarily in connection with hand drills or the like, it is to be noted that the adjustable angle-indicating device may be used in connection with various types of machinery, such as honing, or practically any place wherein a machine operates at an angle with respect to the vertical.

What is claimed is:

An angle indicating device adapted to be secured to a power drill, comprising a body portion embodying a circular member having graduations on the edge thereof, a bolt extending from the edge of the body portion and adapted to be positioned in an opening of the drill, securing the body portion to the drill, a spirit level, a spring tensioned bolt extending from the spirit level mounted in an opening of the body portion, adjustably securing the spirit level to the body portion, a depending flange formed on the spirit level, said flange having an arcuate shaped opening, an indicator pivotally mounted on one end of the body and being adjusted with respect to the spirit level, a set screw extending through the arcuate opening and having connection with said indicator, adjustably connecting the indicator and spirit level, said indicator cooperating with the graduations in indicating angles, and a bolt extending into the edge of the body portion and engaging the bolt extending from the spirit level and securing the spirit level in various positions of adjustment with respect to the body portion.

JULIUS C. IVEY.

REFERENCES CITED

The following references are of record in the file of this patent:

UNITED STATES PATENTS

| Number | Name | Date |
|---|---|---|
| 1,333,559 | Moulton | Mar. 9, 1920 |
| 1,456,431 | Frank | May 22, 1923 |
| 1,526,255 | Taylor et al. | Feb. 10, 1925 |